(12) United States Patent
Luciano, Jr.

(10) Patent No.: US 6,609,970 B1
(45) Date of Patent: Aug. 26, 2003

(54) METHOD AND APPARATUS FOR DISPENSING PRIZES IN A GAMING SYSTEM

(75) Inventor: Robert Anthony Luciano, Jr., Reno, NV (US)

(73) Assignee: Sierra Design Group, Reno, NV (US)

( * ) Notice: Subject to any disclaimer, the term of this patent is extended or adjusted under 35 U.S.C. 154(b) by 62 days.

(21) Appl. No.: 09/870,102

(22) Filed: May 31, 2001

(51) Int. Cl.[7] .............................. A63F 9/24; G06F 17/60

(52) U.S. Cl. ........................................ 463/16; 463/25

(58) Field of Search ........................... 463/16, 17, 23, 463/25, 26, 42; 273/138.1, 139; 700/231; 705/16, 14

(56) References Cited

U.S. PATENT DOCUMENTS

| | | | |
|---|---|---|---|
| 5,287,269 A | | 2/1994 | Dorrough |
| 5,344,199 A | | 9/1994 | Carstens |
| 5,397,125 A | | 3/1995 | Adams |
| 6,007,426 A | | 12/1999 | Kelly et al. |
| 6,015,344 A | * | 1/2000 | Kelly et al. .................... 463/16 |
| 6,293,865 B1 | * | 9/2001 | Kelly et al. .................... 463/16 |
| 6,306,035 B1 | * | 10/2001 | Kelly et al. .................... 463/25 |

* cited by examiner

Primary Examiner—Tony M. Argenbright
(74) Attorney, Agent, or Firm—Jonathan T. Velasco; Russ F. Marsden

(57) ABSTRACT

A method and apparatus for dispensing prizes in a gaming environment which does not require the operator of the gaming environment to maintain a large inventory of such prizes is disclosed. In general, the purchases or sale of prizes are not carried out until the prize award process to a player is carried out.

25 Claims, 4 Drawing Sheets

METHOD AND APPARATUS FOR DISPENSING PRIZES IN A GAMING SYSTEM

BACKGROUND OF THE INVENTION

1. Field of the Invention

This invention pertains generally to prize awarding gaming devices and systems. More particularly, the invention is an enhanced method and apparatus for dispensing prizes in a gaming environment.

2. The Prior Art

Gaming establishments providing gaming devices, such as slot machines, video poker machines, and video lottery systems among others, are well known. Such gaming establishments, or casinos, have been popularized in various jurisdictions.

With the rise of casino properties in operation, casino operators seek various means for increasing the success and profitability of their operation, including installing gaming devices attractive to players. Once implementation attractive to players is applicant's system which provides tangible prize awards pursuant to game play of a gaming machine, which is described in commonly-assigned patent applications Ser. No. 09/660,823 entitled "APPARATUS AND METHOD FOR DISPENSING AWARDS" filed on Sep. 13, 2000 and Ser. No. 09/769,168 entitled "APPARATUS AND METHOD FOR DISPENSING AWARDS" filed on Jan. 24, 2001. Under this system, a player is able to win tangible prize awards according to one or more game events or game wins on a gaming device.

In some cases, the tangible prize awards available for redemption by a player may be of substantial value or cost. In general, having a large or otherwise substantial inventory of such tangible prize awards is undesirable, in part because the casino operator is exposed to a number of risks including, among other things, risk of theft and a burden in supporting a large inventory of prizes.

BRIEF DESCRIPTION OF THE INVENTION

To satisfy these and other disadvantages in the prior art, disclosed herein is a method and apparatus for dispensing prizes in a gaming environment which does not require the operator of the gaming environment to maintain a large inventory of such prizes. In general, prizes which are available for award are not "purchased" by the casino until at the time or during the time of award to the player.

According to one embodiment, the method for awarding at least one prize in a gaming environment comprises: establishing an "award" value for one or more prizes which will be awarded based on play of a gaming device; establishing a "commit" value for the prize; negotiating a commitment from a vendor to sell the prize for the commit value where the actual purchase of the prize is carried out at some later predetermined time or window of time; making the prize available for redemption pursuant to one or more triggering game events on a gaming device; determining the occurrence of a redeeming event; upon the occurrence of the redeeming event, purchasing the prize from the vendor at the commit value; and awarding the prize to the player the gaming device.

The prizes in the above example embodiment may be awarded from a gaming device or from a central or shared prize station or prize kiosk via dispensing means. Alternatively, the prizes may be awarded from a "networked" distribution center or online vendor via the gaming device other networked station or kiosk. In such cases, the distribution center or online vendor is operatively coupled (or configured to be operatively coupled) for communication with the gaming environment.

Prizes which are particularly suitable for use with present invention include such prizes as airline tickets, hotel accommodations, vacation packages, and event tickets, for example. The present invention is also suitable for use with tangible prizes such as jewelry, cars, coins, and precious metals, for example. Similarly, the present invention is also advantageous for other prizes such as "services" including gardening services and cleaning services, for example.

In other embodiments, a voucher or printed ticket (or other "symbolic" or redeemable award) may be provided to the player during the prize award process from the gaming device. The voucher or ticket (or symbol award) may then be redeemed for the actual prize won by the player (via a prize station or kiosk, via a gaming machine equipped with a vault and/or prize dispenser, or via a network distribution center or online vendor).

The invention also provides means for dynamically promoting and/or advertising prizes and awards which may be won in the gaming environment. Traditionally prizes, particularly tangible prizes, are displayed "staticly". That is, prizes are displayed in a static format (e.g., single display or image). One exception to this general usage of a static display is the "progressive meter" which shows an incremental counter to indicate the "increasing award value" of a progressive prize. In the present invention, the gaming devices and/or the prize station or kiosk is configured to dynamically display prizes either in an attract mode feature or in response to user input. Under this arrangement, animation, dynamic video and/or audio may be used to promote certain prizes or awards. Additionally, the casino may be able to derive additional revenue via advertising fees for promoting the prizes/awards.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
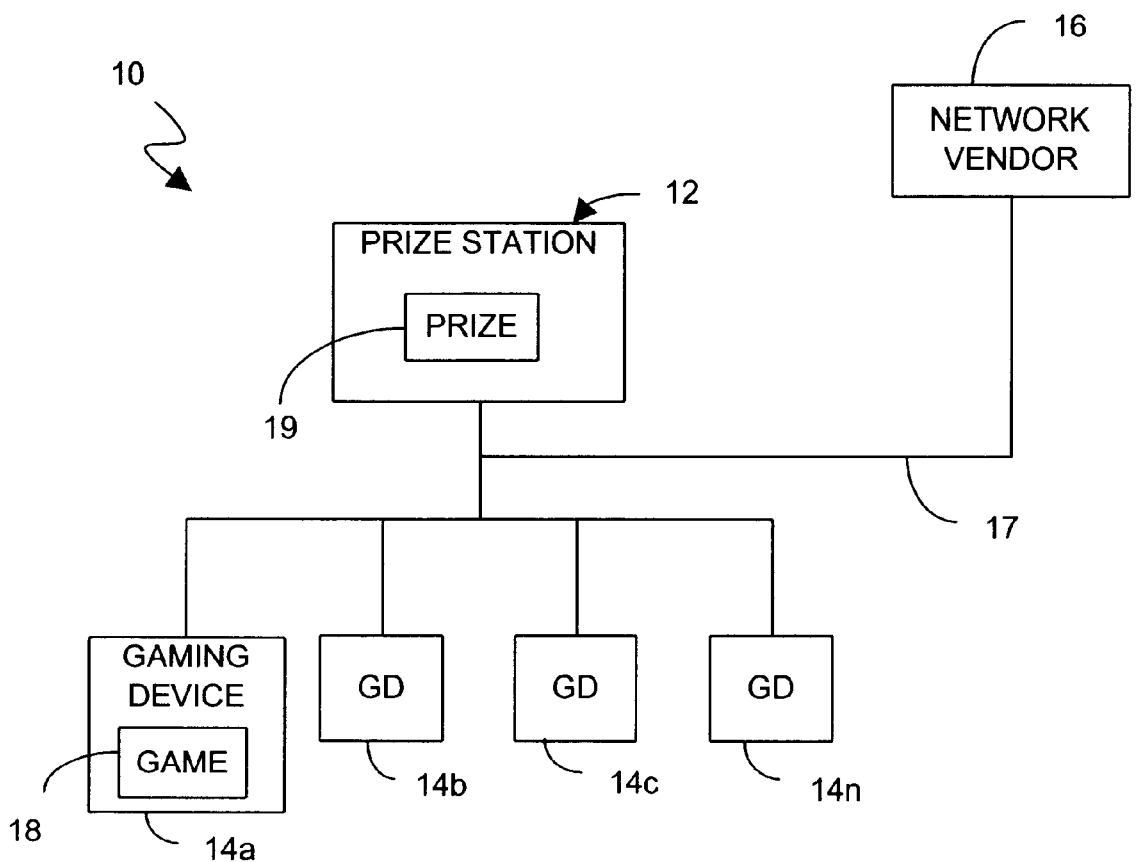
FIG. 1 is a functional block diagram of an example gaming system for awarding a prize in accordance with the invention.
Figure 2:
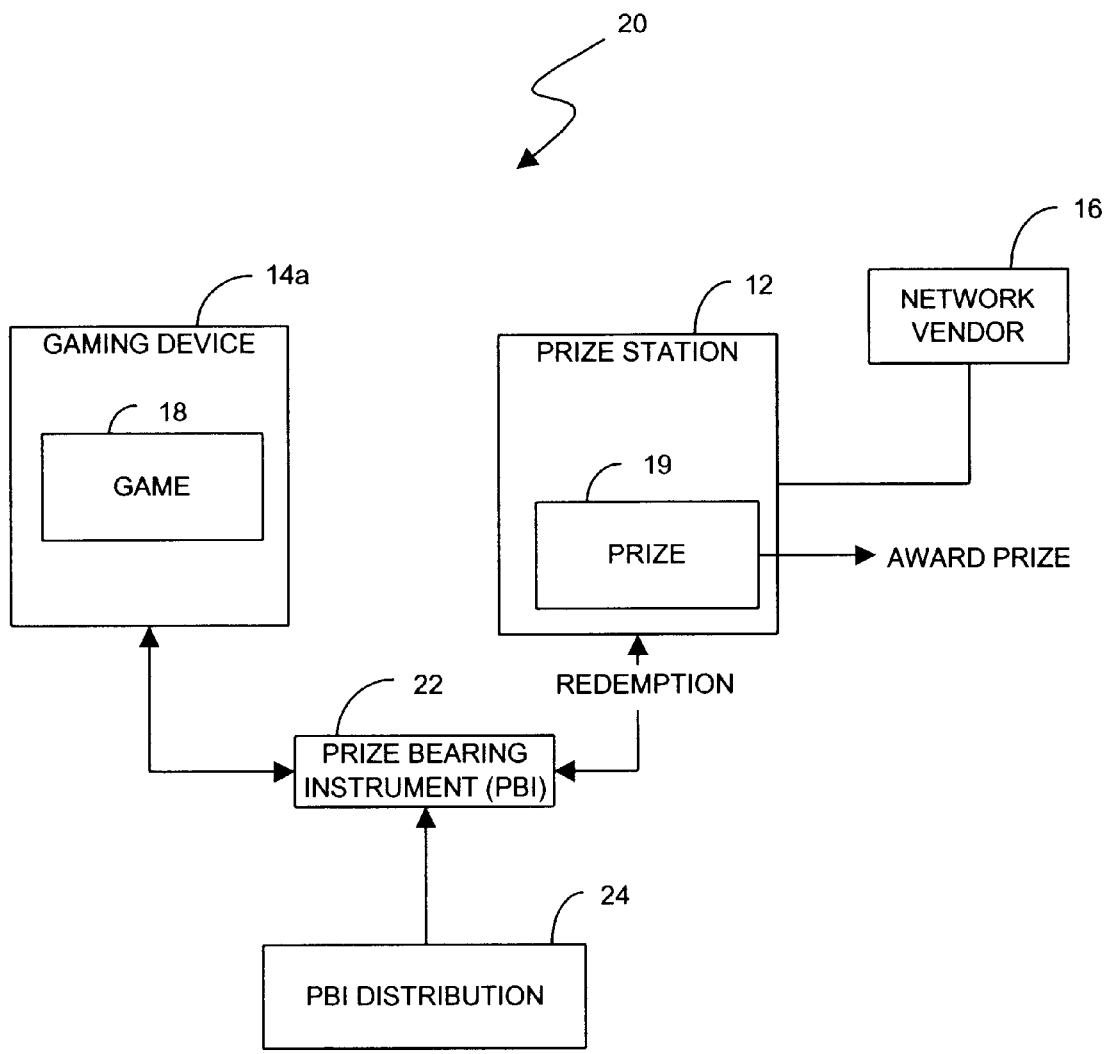
FIG. 2 is a functional block diagram of an example gaming system for awarding a prize in accordance with the invention is shown according to another embodiment.
Figure 3:
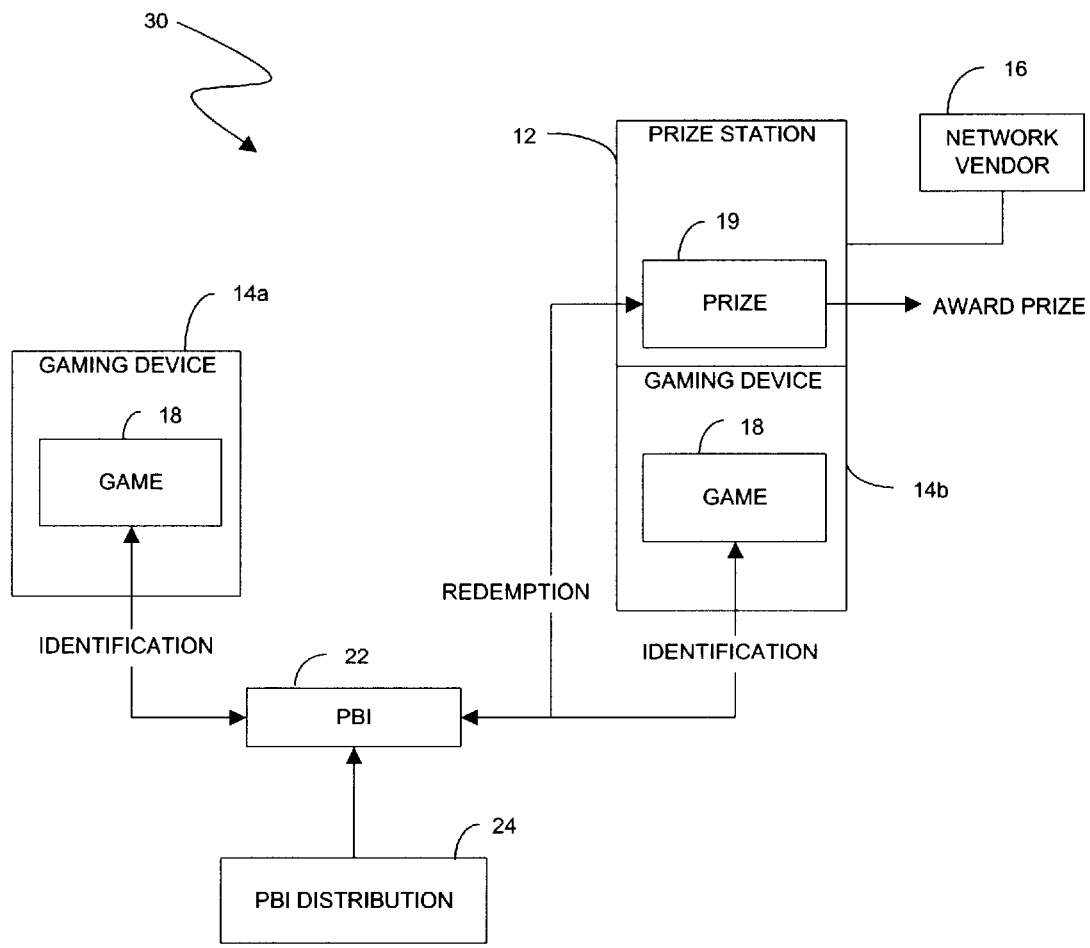
FIG. 3 is a functional block diagram of an example gaming system for awarding a prize in accordance with the invention is shown according to another embodiment.
Figure 4:
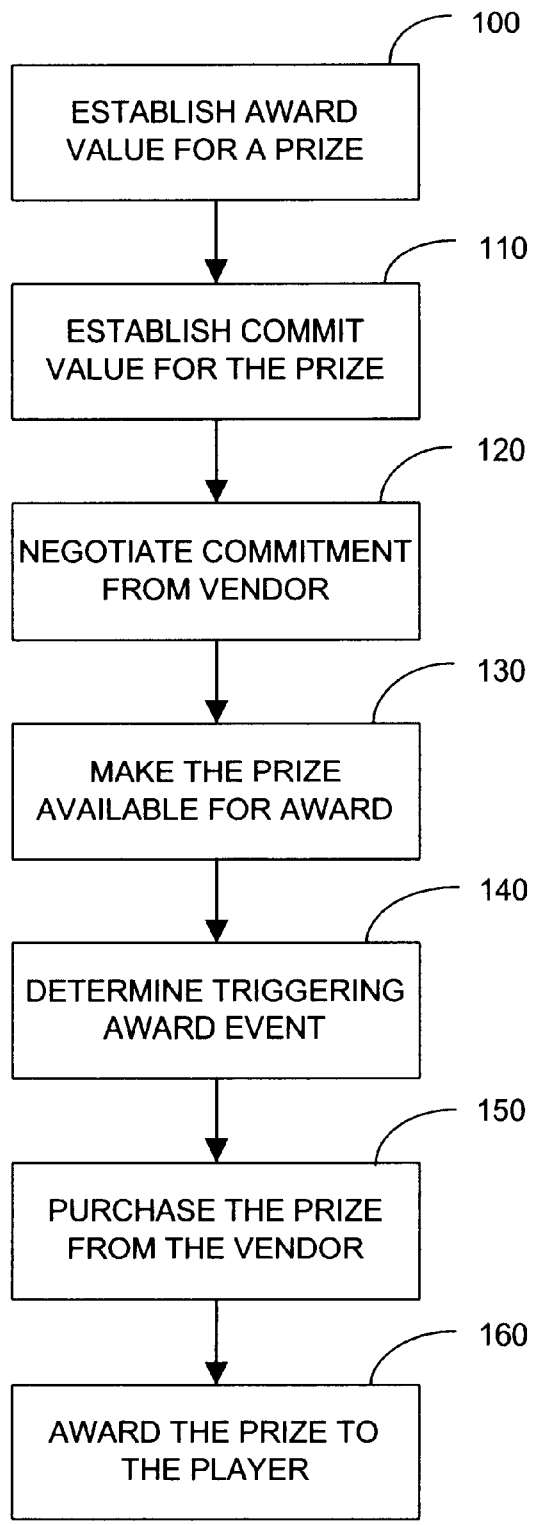
FIG. 4 is a logical flow diagram depicting the actions generally associated with carrying out the present invention according to an example embodiment.

Referring more specifically to the drawings, for illustrative purposes the present invention is embodied in the apparatus shown FIG. 1 through FIG. 3 and the method outlined in FIG. 4. It will be appreciated that the apparatus may vary as to configuration and as to details of the parts, and that the method may vary as to details and the order of the acts, without departing from the basic concepts as disclosed herein.

Referring first to FIG. 1, a functional block diagram of an example gaming system 10 for awarding a prize in accordance with the invention is shown. The system 10 comprises a prize station 12 operatively coupled for communication with a plurality of gaming devices 14a through 14n. The prize station 12 is further coupled for communication with at least one network vendor 16 via a network connection 17.

Each gaming device 14a through 14n comprises a conventional game of chance allowing a player to play a game 18, such as a slot machine, video poker machine, video lottery device, keno machine, bingo machine. The gaming device 14a through 14n may alternatively comprise a live table game of chance, such as a blackjack table or roulette table, where the functions described herein carried out by the gaming device are carried out by a table attendant.

The gaming device 14a through 14n includes conventional hardware and software components (not shown), such as a processor, memory, and input/output devices such as a video output and control inputs, and game software, for executing game 18. According to play of the game 18, one or more game results may provide the player with an "award credit". As noted above, the game results may be provided by a game of chance involving random events or may be provided from a predetermined outcome selected from a fixed pool (e.g., a lottery).

Award credits, unlike conventional game credits which are used for playing the game 18, are suitable for redemption of prizes or awards on the prize station 12. For example, the award credits may comprise game pieces or "components" which may be collected by the player for redemption at the prize station 12. In this example, the game pieces may be part of a game board or puzzle and when the player has collected a total or particular subset (i.e., collection or accumulation) of game pieces, the player may be entitled to an award or prize from the prize station 12.

Awards credits earned by may be collected and saved for later accumulation and redemption as described in commonly-assigned U.S. patent application Ser. No. 09/742,679 entitled "APPARATUS AND METHOD FOR MAINTAINING GAME STATE" filed Dec. 20, 2000, the disclosure of which is incorporated herein by reference. Accordingly, the gaming device 14a through 14n is configured to maintain a record of the accumulated award credits (game pieces) associated with the player, including award credits earned during play of the game 18.

The player may maintain the player's state of award credits earnings (e.g., game state) even when the player has terminated play of the gaming device 14a through 14n. As shown in FIG. 2, the player's game state is maintained via a prize bearing instrument (PBI) 22. The PBI 22 may comprise any media suitable for associating a player's award credits with the player. Example media include a printed ticket (voucher), a magnetic or smart card, or other information storage medium.

As an interface to the PBI 22, the gaming device 14a through 14n provides a PBI reader/writer device (not shown) capable of reading a PBI 22 and writing to (or generating) a PBI 22. The PBI 22 will typically contain one or more data records indicating the number of (or collection of) award credits earned by the player. For vouchers, the gaming device 14a through 14n will include a voucher reader and a voucher printer in operable communication with the game device 14a through 14n. When the player selects to terminate play, the gaming device 14a through 14n prints a voucher indicating the number of award credits earned by the player. The data associated with a player and the player's associated credits may be maintained in a conventional database (not shown) operatively coupled for communication with each of the gaming devices 14a through 14n (as well as prize station 12).

Referring again to FIG. 1, the prize station 12 comprises one or more prizes 19, which may be redeemed by a player pursuant to play on the gaming devices 14a through 14n. The prize station 12 further comprises conventional hardware (e.g., processor, memory, input/output devices) and programming (e.g., software) for carrying out the functions described herein. The prizes 19 are typically a form of a tangible prize or service. The prizes 19 are normally depicted "symbolically," although the actual prize may also be depicted for award by the prize station 12. For example, the prizes may be displayed on a video monitor, or may be represented on a voucher which is in turn redeemable for the actual prize.

According to the present invention, the prizes 19 are not "purchased" by the casino which operates system 10 until or during the time of award to a player during redemption. Instead, the casino obtains a "commitment" from a seller to sell the actual prize at a later time, normally during a period or window of time. Under this arrangement, the casino is able to defer investments in prizes available for award until the time of redemption, thereby reducing the revolving inventory of the casino not normally achieved in the prior art. The seller is represented in FIG. 1 as network vendor 16 in operable communication with the prize station 12 via network connection 17 for carrying out commitment and sales transactions in accordance with the invention. The process for carrying out the award process (including establishing commitments and sales) in accordance with the present invention is described in further detail below in conjunction with FIG. 4.

Although not required for operation of the invention, the prizes 19 are not generally redeemable directly via cash payments by the player to the prize station 12 or the game devices 14a through 14n. Rather the prizes 19 are normally redeemable via award credits earned by the player from playing the gaming device 14a through 14n or from other distribution means 2. The redemption process 26 is initiated by a player, generally by presenting one or more PBI 22 to the prize station 14. The prize station 14 is equipped with a PBI reader/writer device (not shown) for reading the PBI 22 and determining the award credits associated with the player from data provided by the PBI 22. The prize station then determines the prizes to which the player is entitled according to the award credits earned by the player. For example, prizes may be selected according to the number of award credits earned (e.g., using a hierarchical prize level arrangement) or according to the collection of types of award credits earned (e.g., game pieces on a game board or puzzle) or both. Other prize payout arrangements may also be used.

The prize station 12 offers the player a selection of prizes. After the player's selection, the selected prize is "purchased" by the prize station 12 from the network vendor 16, such as via an online transaction, for example. After the selected prize is purchased, the prize is awarded to the player. According to one embodiment of the invention, the prizes are maintained in vaults having doors secured by latches and windows to thereby allow the player to see the prizes inside the vaults and yet provided a level of security by limiting access to the prize. A button actuator receives the player's selection. In response, the latch is released allowing the player to open the door and retrieve the prize. In another embodiment of the invention, an attendant provides the prize to the player in response to the player's selection (e.g., hand-pay).

According to another embodiment of the invention, a "symbolic" representation of the prize is awarded or dispensed to the player form the prize station. For example, the prize station 12 may provide the player a "voucher" (or coupon) which the player may redeem via other means, such as via an attendant prize booth, via a commercial vendor, or via an online vendor (Internet vendor). In other embodiments, the player is able to request delivery of the selected prize via a conventional courier service (e.g., U.S. Mail, United Parcel Service) to the player's selected destination or mailing address. This scenario is particularly useful, where the prize station 12 is configured as a "network kiosk" having conventional computer functionality to allow the player to access the network vendor 16 for selection and redemption of prizes.

As illustrated in the sample system 30 of FIG. 3, the prize station 12 and a gaming device 14b may be integrated into a single unit, where for example, the prize station 12 comprises a "top box" to the gaming device 14b. Under this arrangement, a player is able to earn award credits from one or more gaming machines, such as gaming device 14a and then redeem the prize 19 from the prize station 12 which is integrated with gaming device 14b.

The method and operation of invention will be more fully understood with reference to the logical flow diagram of FIG. 4, as well as FIG. 1 through FIG. 3. FIG. 4 depicts the actions generally associated with carrying out the present invention in accordance with one of the preferred embodiments. The order of actions as shown in FIG. 4 and described below is only illustrative, and should not be considered limiting.

First at block 100, a prize for award is selected and an "award value" for the prize is established. The prize is generally selected from those available by the network vendor 16. The award value generally relates to the likelihood of award based on game play (i.e., related to the chances of winning the prize based on the game 18) according to desired profitability projections as is well known in the art. The prize station 12, which makes the prize available for redemption, may be used to carry out this process automatically based on a profitability table as the need for prizes arises (i.e., dynamically). Alternatively, this process may be carried out by an attendant manually, normally based on a profitability table.

Next at block 110, a "commit" value for the prize of block 100 is established. The commit value, which may or may not be same value as the award value, is used for establishing a purchase price from a seller (network vendor 16). This commit value may be prescribed or fixed by the network vendor, or may be negotiated between the casino and the network vendor 16 in real-time (i.e., dynamically). As with the process of block 110, this process may be carries out automatically by the prize station 12 or manually by a casino operator, generally in communication with the network vendor 16 over the network connection 17.

Next at block 120, the "commit" value established in block 110 is used to negotiate a commitment from the network vendor 16 to sell the prize at the commit value. The commitment, unlike a sale, is a promise/assurance by the network vendor 16 to sell the prize at some later time (namely, during the process of awarding the prize to a winning player). In some cases, the commitment may be valid only for a period of time (e.g., valid only for the next three months) or may be valid for an "unlimited" time. Where the commitment is valid for an unlimited time, there may be a provision for one or both of the parties (i.e., the casino or the network vendor) to later terminate the commitment via some communication. In other cases, the nature of the prize may be such that the prize is only valid for a particular period (e.g., event tickets such as "Super Bowl 30"). In yet other scenarios, the casino may be required to pay a "fee" for the commitment, but in other arrangements, the commitment may be obtained without a fee from a network vendor 16.

Next at block 130, after a commitment has been established, the prize(s) are made available for redemption (i.e., for winning) from the prize station 12 pursuant to play on the gaming devices 14a through 14n. Once available for redemption and award, the prize is "visible" to players via various display means, whether by symbolic or actual representation, video and/or audio promotion, graphics, signage among others. Typically, the prize is "advertised" on or visible via the prize station 12, but may also be presented to the players via the gaming devices 14a through 14n, as well as other display or attract devices in the casino environment. Another useful means for advertising the prizes is via network communications (e.g., "Web" pages, electronic-mail) as wells as conventional advertising techniques, conventional mailings, street vendors, billboards, etc.

As described above, players may obtain the requisite award credit(s) or prize triggering event(s) by play of the gaming devices 14a through 14n. In some cases, the player may be required to obtain just one award-winning event, and in other arrangements, the player may be required to obtain more than one award-winning event (e.g., a collection, subset of events).

At block 140, when the player has obtained the requisite award credits(s) or prize triggering event(s) for redeeming at least one of the prizes for award by the prize station 12, the player is provided a choice or menu to select the prize(s) available for redemption. The choice/menu is generally provided by the prize station 12 upon presentation by the player of one or more PBls 22 to the prize station 12. The PBI 22 identifies the player as well as the player's collection of prize to thereby determine the prize(s) to which the player is entitled for redemption. In other embodiments, where for example the player obtains the requisite award credits(s) or prize triggering event(s) for redemption during play of the gaming devices 14a, a display of the gaming device may be used to present the player with the menu or choices of prizes.

At block 150, the player makes a prize selection constituting a redemption event, and in response the prize is "purchased" from the network vendor 16, normally by the prize station 12 via network communication to the network vendor 16. At this point, the sales transaction for selected prize is consummated between the casino and the network vendor. The appropriate transaction requests and communication is carried out in conjunction with this process, preferably using secure communications. These transactions and secure communications are well known in the art, and conventional means for transacting this sale may be used. For example, a "server" script or program operable by the prize station 12 may carry out transaction requests with a "server sales program" operable by a computer device by the network vendor using secure socket layer protocols. The present invention anticipates use of other communication methods for carrying out this transaction including private or specially designed protocols, and such use is within the scope and spirit of the present invention.

At block 160, the prize is awarded to the player, normally by the prize station 12, using dispensing means, such as via an "openable" or releasably-locked "vault". In other embodiments, the prize station may print a voucher or ticket suitable for later exchange or redemption for the actual prize. In some arrangements, the prize station 12 is configured as a "network kiosk" as described above. In these arrangements, the player may view and select prizes via a video display (e.g., LCD, touch-screen or other monitor display) and may further elect delivery of the prize via a courier services, such as U.S. Mail or UPS, to the player's home or delivery address.

In yet other embodiments, the gaming devices 14a through 14n may also provide the prize to the player is the form of a printed ticket (or voucher) which may be exchanged or redeemed for the actual prize.

Accordingly, it will be seen that this invention provides a method and apparatus for dispensing prizes in a gaming environment which does not require the operator of the gaming environment to maintain a large inventory of prizes by deferring the sale or purchase the prize(s) awarded to a player until the prize award process. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for awarding at least one prize in a gaming environment having at least one gaming device, said gaming device configured to allow a player to play a game of chance, said method comprising:
    establishing an award value for said at least one prize, said award value communicable to a player;
    establishing a commit value for said prize, said commit value being a maximum value payable to a vendor for said prize and not revealed to a player;
    negotiating a commitment from a vendor to sell said prize for said commit value for a time period that includes at least a future time;
    making said prize available for redemption pursuant to at least one triggering game event on said at least one gaming device and corresponding to said time period;
    determining the occurrence of at least one redeeming event corresponding to at least one triggering game event;
    purchasing said prize for said commit value from said vendor at a time that is one of concurrently with, or, subsequent to, said occurrence of said at least one redeeming event where said redeeming event and said subsequent purchasing said prize occur during said time period; and
    awarding said prize to a player.

2. The method of claim 1, wherein said prize is located within a secure housing integral with said at least one gaming device.

3. The method of claim 1, wherein said prize is located within a secure housing integral with a prize station kiosk in operable communication with said at least one gaming device.

4. The method of claim 1, wherein said awarding said prize further comprises issuing a voucher to said player, said voucher redeemable for said prize.

5. The method of claim 1, wherein said prize comprises a vacation package including travel services.

6. The method of claim 1, wherein said prize comprises a vacation package including accommodations.

7. The method of claim 1, wherein said prize comprises travel services.

8. The method of claim 1, wherein said prize comprises tangible goods.

9. The method of claim 1, wherein said prize redeeming event comprises a prize selection by a player.

10. The method of claim 1 further comprising:
    determining the award credits associated with a player, said award credits issued pursuant to triggering game events on said gaming device;
    determining whether said player is entitled to said at least one prize according to said determined award credits associated with a player;
    providing to said player an option to select said at least one prize if said player is entitled to said at least one prize according to said determined prize award credits associated with said player; and
    receiving from said player a prize selection, said prize selection constituting said prize redeeming event.

11. A method for awarding at least one prize in a gaming environment having at least one gaming device, said gaming device configured to allow a player to play a game of chance, said method comprising:
    establishing an award value for said at least one prize, said award value communicable to a player;
    establishing a commit value for said prize, said commit value being a maximum value payable to a vendor for said prize and not revealed to a player;
    negotiating a commitment from a vendor to sell said prize for said commit value for a time period that includes at least a future time;
    making said prize available for redemption pursuant to a plurality of triggering game events on said at least one gaming device and corresponding to said time period;
    determining the occurrence of at least one redeeming event corresponding to said plurality of triggering game events;
    purchasing said prize for said commit value from said vendor at a time that is one of concurrently with, or, subsequent to, said occurrence of said redeeming event where said redeeming event and said subsequent purchasing said prize occur during said time period; and
    awarding said prize to a player.

12. The method of claim 11 further comprising:
    determining the award credits associated with a player, said award credits issued pursuant to triggering game events on said gaming device;

determining whether said player is entitled to said at least one prize according to said determined award credits associated with a player;

providing to said player an option to select said at least one prize if said player is entitled to said at least one prize according to said determined prize award credits associated with said player; and receiving from said player a prize selection, said prize selection constituting said prize redeeming event.

13. The method of claim 11, wherein said prize comprises a vacation package including accommodations.

14. The method of claim 11, wherein said prize comprises travel services.

15. The method of claim 11, wherein said prize comprises tangible goods.

16. The method of claim 11, wherein said prize redeeming event comprises a prize selection by a player.

17. A program storage device readable by a machine, tangibly embodying a program of instructions executable by the machine to perform a method for awarding at least one prize in a gaming environment having at least one gaming device, said gaming device configured to allow a player to play a game of chance, said method comprising:

establishing an award value for said at least one prize, said award value communicable to a player;

establishing a commit value for said prize, said commit value being a maximum value payable to a vendor for said prize and not revealed to a player;

negotiating a commitment from a vendor to sell said prize for said commit value for a time period that includes at least a future time;

making said prize available for redemption pursuant to said at least one triggering game event on said at least one gaming device and corresponding to said time period;

determining the occurrence of at least one redeeming event, said redeeming event corresponding to said at least one triggering game event;

purchasing said prize for said commit value from said vendor at a time that is one of concurrently with, or, subsequent to, said occurrence of said at least one redeeming event where said redeeming event and said subsequent purchasing said prize occur during said time period; and awarding said prize to a player.

18. The method of claim 17, wherein said awarding said prize further comprises issuing a voucher to said player, said voucher redeemable for said prize.

19. The method of claim 17, wherein said prize comprises a vacation package including travel services.

20. The method of claim 17, wherein said prize comprises a vacation package including accommodations.

21. The method of claim 17, wherein said prize comprises travel services.

22. The method of claim 17, wherein said prize comprises tangible goods.

23. The method of claim 17, wherein said prize redeeming event comprises a prize selection by a player.

24. A method for awarding at least one prize in a gaming environment having at least one gaming device, said gaming device configured to allow a player to play a game of chance, said method comprising:

establishing an award value for said at least one prize, said award value communicable to a player;

establishing a commit value for said prize, said commit value being a maximum value payable to a vendor for said prize and not revealed to a player;

negotiating a commitment from a vendor to sell said prize for said commit value for a time period that includes at least a future time;

making said prize available for redemption pursuant to at least one triggering game event on said at least one gaming device and corresponding to said time period;

determining the award credits associated with the player, said award credits issued pursuant to triggering game events on said gaming device;

determining whether said player is entitled to said at least one prize according to said determined award credits associated with said player;

providing to said player an option to select said at least one prize if said player is entitled to said at least one prize according to said determined award credits associated with said player;

receiving from said player a prize selection, said prize selection constituting said prize redeeming event;

purchasing said prize for said commit value from said vendor at a time that is one of concurrently with, or, subsequent to, said occurrence of said at least one redeeming event where said redeeming event and said subsequent purchasing said prize occur during said time period; and awarding said prize to the player.

25. A method for awarding a plurality of prizes in a gaming environment having at least one gaming device, said gaming device configured to allow a player to play a game of chance, said method comprising:

establishing an award value for each of said prizes, said award value communicable to a player;

establishing a commit value for each of said prizes, said commit value being a maximum value payable to a vendor for each of said prizes and not revealed to a player;

negotiating a commitment from a vendor to sell each of said prizes for said commit value for a time period that includes at least a future time;

making said prizes available for redemption pursuant to at least one triggering game event on said at least one gaming device and corresponding to said time period;

determining the award credits associated with the player, said award credits issued pursuant to triggering game events on said gaming device;

determining whether said player is entitled to said at least one prize according to said determined award credits associated with said player;

providing to said player an option to select said at least one prize if said player is entitled to said at least one prize according to said determined award credits associated with said player;

receiving from said player a prize selection, said prize selection constituting said prize redeeming event and establishing a selected prize;

purchasing said selected prize from said vendor at a time that is one of concurrently with, or, subsequent to, said occurrence of said at least one redeeming event where said redeeming event and said subsequent purchasing said prize occur during said time period; and awarding said prize to the player.

* * * * *